(12) United States Patent
Åberg et al.

(10) Patent No.: US 6,630,646 B1
(45) Date of Patent: Oct. 7, 2003

(54) METHOD AND ARRANGEMENT FOR GAS METAL ARC WELDING

(76) Inventors: Per Åberg, Hjortronstigen 2, SE-695 30 Laxå (SE); Lars Bengtsson, von Boijgatan 10 A, SE-695 32 Laxå (SE); Anders Allansson, Stjärngatan 8, SE-692 33 Kumla (SE)

( * ) Notice: Subject to any disclaimer, the term of this patent is extended or adjusted under 35 U.S.C. 154(b) by 0 days.

(21) Appl. No.: 09/856,224
(22) PCT Filed: Nov. 19, 1999
(86) PCT No.: PCT/SE99/02141
  § 371 (c)(1),
  (2), (4) Date: May 21, 2001
(87) PCT Pub. No.: WO00/33999
  PCT Pub. Date: Jun. 15, 2000

(30) Foreign Application Priority Data

Nov. 19, 1998 (SE) ................................. 9803971

(51) Int. Cl.⁷ .................................................. B23K 9/10
(52) U.S. Cl. ............................... 219/137 PS; 219/130.5
(58) Field of Search ......................... 219/130.5, 130.21, 219/130.31, 130.32, 130.33, 137.71, 137 PS

(56) References Cited

U.S. PATENT DOCUMENTS

| | | | | |
|---|---|---|---|---|
| 2,897,343 A | * | 7/1959 | Regnauld et al. | ........ 219/130.5 |
| 3,148,266 A | * | 9/1964 | Bichsel et al. | ......... 219/137.71 |
| 3,906,184 A | * | 9/1975 | Gibbs et al. | ........... 219/130.21 |
| 4,443,687 A | | 4/1984 | Toth | |
| 5,514,851 A | | 5/1996 | Siewert et al. | |

FOREIGN PATENT DOCUMENTS

| | | |
|---|---|---|
| DE | 3234002 | 11/1983 |
| WO | 9839130 | 9/1998 |

* cited by examiner

*Primary Examiner*—Clifford C. Shaw
(74) *Attorney, Agent, or Firm*—Nils H. Ljungman & Associates

(57) ABSTRACT

The invention relates to a method for preventing the welding electrode sticking in the contact nozzle and a welding power source of the inverter type for MIG/MAG with these characteristics. A short fading of the current takes place before the welding current is switched off.

12 Claims, No Drawings

METHOD AND ARRANGEMENT FOR GAS METAL ARC WELDING

TECHNICAL FIELD

This invention relates to a method for gas metal arc welding with an inverter power source, and a welding power source of the inverter type with properties associated with terminating welding which prevent the welding wire from sticking in the contact nozzle on the welding burner connected to the welding power source.

BACKGROUND

In gas metal arc welding, in the following called MIG/MAG welding, the equipment comprises a gas container, reel of wire, wire feeder, welding power source, welding cable and welding burner which comprises a first pipe for taking the protective gas to the molten pool and a second pipe situated inside the first to take the welding wire to the molten pool and to transmit the welding current to the said welding wire. In the following this second pipe is called the contact nozzle.

There has always been a certain tendency for the wire to stick in the contact nozzle. The solutions have concentrated upon reducing the friction in all parts which take the wire from the wire feeder to the workpiece. Wire guides of Teflon or similar material are an example of such a solution, and great care has been taken to manufacture the wire with as smooth a surface as possible.

Other measures have regarded the main problem as being deposits from the welding wire, either from its thin copper layer or from residues from the wire drawing process.

Solutions have been of a mechanical nature—better feeders, greater tolerances between the wire and the hole in the contact nozzle or self-cleaning contact nozzles.

However, wider tolerances in the contact nozzle result in a poorer electrical contact and thereby poorer current transmission.

This has been solved by ingenious contact nozzles such as spiral-shaped or parrot-beaked nozzles in order to achieve better contact points. Contact nozzles of the normal pipe model have sometimes been given improved characteristics by a little mechanical impact in order to create a distinct contact point. However, such solutions result in increased friction which is not desirable for even wire feeding. In addition, the mechanical wear and tear on such nozzles is greater, which reduces their working life.

Since the 1980's welding power sources of the inverter type have been used. The weight and size of the power source is reduced, which is an advantage. In particular, however, the power sources are much quicker to regulate which has meant that the emphasis for the regulation of the welding process has moved from the wire feeder to the power sources. During continual welding the object of the regulation is to supply melting power at a corresponding rate to the feed rate of the electrode.

Problems associated with commencing welding have been observed with these power sources, particularly when welding with stainless electrodes. The wire can then stick in the contact nozzle at the actual moment of commencing welding. In the work leading up to this invention it was also studied how the wire behaved during the concluding stage, that is just when the welding current is about to be shut off.

The surprising result of these investigations was that the wire did not become wedged in the contact nozzle in connection with the wire feeder motor coming to a stop. On the contrary, at the moment the welding current stopped, the wire was brought to an immediate stop in the contact nozzle, while the wire feeder fed out further wire which was taken up by the play in the wire guide which connects the feeder and the contact nozzle.

AIM OF THE INVENTION

The aim of the invention is to produce a method or a welding power source of the inverter type, which provides a solution to the problem of electrodes sticking in the contact nozzle during MIG/MAG welding without the disadvantages from which the known technique suffers.

The invention solves the problem in the way specified in the characteristic portions of the independent claims.

DESCRIPTION OF PREFERRED EMBODIMENTS

Examples of embodiments of the invention will now be described.

Welding power sources of the inverter type have a control unit which sends commands to the power unit concerning the welding current which at each moment is to be transmitted to the welding cable which connects the contact nozzle with the power source. In the contact nozzle the current passes to the welding wire which then passes the current to the workpiece via the arc and from there back to the power source via the return lead. The welding wire is continually fed forwards at a certain speed by the wire feeder and while this is continuing the process regulation is carried out via the control unit so that sufficient current is supplied to the arc for the wire which has been fed forward to be melted at the same rate as it is fed forwards.

At the termination of the welding, the feeder is stopped first while the controlling of the power source continues during an after-burning time, so adjusted that the wire will not set fast in the molten pool on the workpiece and nor will it burn up in the contact nozzle and damage this.

Sometimes there is a gradual reduction in the power in order to fill craters in the molten pool on the workpiece. This crater-filling time is 0.2–3 seconds.

The invention causes the control unit in the power source to carry out a fading of the welding current immediately before the current is cut off.

It has proved very effective to insert a fading time of 0.5–100 milliseconds, and an even better interval is 1–15 milliseconds.

This has almost completely eliminated the problem of the wire sticking in the contact nozzle when the welding is terminated and in fact has also almost eliminated the occasions when the wire became stuck in connection with the commencement of welding. Thus after this measure is utilized, a contact nozzle can be used for commencing welding on up to ten times more occasions before the problem arises. The solution is simple to implement in the control unit's microcomputer. Of course solution can also be implemented in discrete hardware in both digital and analogue form—the construction of the control unit determines the form of implementation.

The reason that the invention works is probably that a very small molten mass forms between the welding wire and the contact nozzle as a result partly of resistive heating and partly of spark formation inside the contact nozzle, particularly when it has become somewhat worn, If the current is stopped abruptly the wire sets fast in this molten mass and the remaining pushing force from the feeder is not sufficient to release the wire. As the molten mass is reduced in size due to the fading of the current, the adherence will be less and the pushing force is able to release the wire immediately.

The problem connected with the wire sticking at the commencement of welding is probably connected with remaining residues on the front of the contact nozzle originating from the wire sticking at the termination of welding. At the commencement of welding the arc often burns right up to the contact nozzle momentarily. Residues from the termination of welding on the front opening of the contact nozzle then melt but solidify again when the arc returns immediately to its normal position (between the electrode projection and the workpiece), so that there is a danger of the wire sticking. As the residues from the termination of welding are so much less when the invention is applied, this solution also works in this case.

The invention works best with a number of uniform stages and a fading of the current of approximately 10 milliseconds length in total. However, an obvious benefit is obtained, even if fewer stages are used and also if they vary in size. Of course an embodiment with a purely analogue fading slope can be used.

What is claimed is:

1. A method for reducing the adherence of the welding wire to the contact nozzle at the intentional termination of gas metal arc welding with a power source of the inverter type, wherein immediately before the welding current is shut off during intentional termination of the welding operation, the control unit for the welding current in the power source is caused to fade the said welding current over a period of time of between 0.5 and 100 milliseconds so that the power development in the current transition between the welding wire and the contact nozzle is so low that the molten mass which has formed between the welding wire and the contact nozzle is so small that when the molten mass has set when the current is shut off, the molten mass is not able to hold the wire fast against the pushing force on the welding wire from a feeder as the welding wire is coming to a stop.

2. The method of claim 1, wherein the time for the fading of the current is 1 to 15 milliseconds.

3. The method according to claim 2, wherein the fading of the current takes place in at least two stages.

4. The method according to claim 3, wherein the fading of the current takes place in principally equally large stages.

5. The method according to claim 2, wherein the fading of the current takes place in principally equally large stages.

6. The method according to claim 1, wherein the fading of the current takes place in at least two stages.

7. The method according to claim 6, wherein the fading of the current takes place in principally equally large stages.

8. The method according to claim 1, wherein the fading of the current takes place in principally equally large stages.

9. A welding power source of the inverter type being configured for gas metal arc welding, said welding power source comprising a control unit and power unit, the control unit being configured to give commands to the power unit regarding what welding current is to be supplied at each moment of a welding operation, the control unit being configured such that, immediately before the control unit gives the command to shut off the welding current during intentional termination of the welding operation, the control unit initiates a fading of the welding current lasting between 0.5 and 100 milliseconds so that the power development in the current transition between the welding wire and the contact nozzle is so low that the molten mass which has formed between the welding wire and the contact nozzle is so small that when the molten mass has set when the current is shut off, the molten mass is not able to hold the wire fast against the pushing force on the welding wire from a feeder as the welding wire is coming to a stop.

10. The welding power source according to claim 9, wherein the control unit is configured to initiate a fading of the current lasting between 1 and 15 milliseconds.

11. The welding power source according to claim 10, wherein the control unit is configured to initiate a fading of the current in principally equally large stages and where the number of stages is at least two.

12. The welding power source according to claim 9, characterized in that the control unit is configured to initiate a fading of the current in principally equally large stages and where the number of stages is at least two.

* * * * *